Patented Dec. 30, 1930

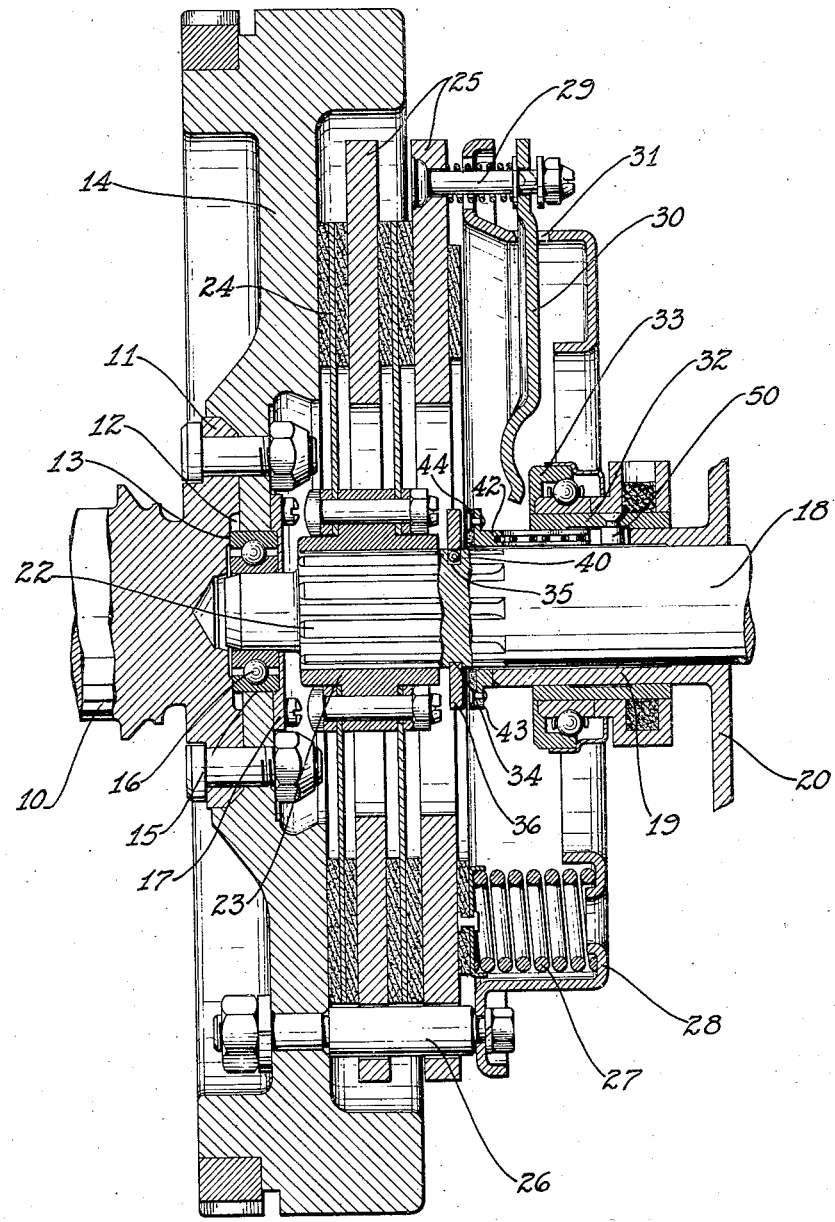

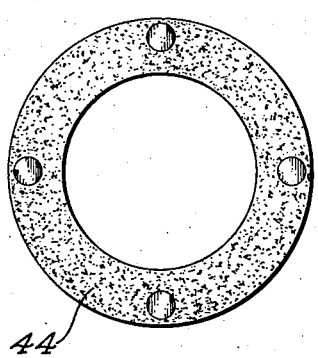
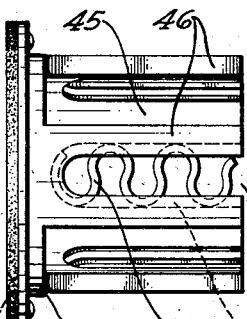
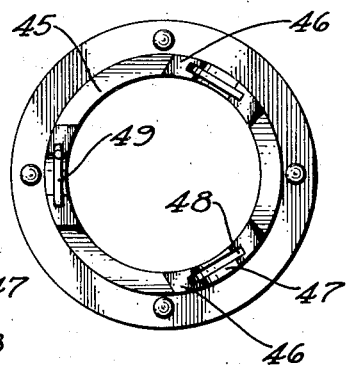
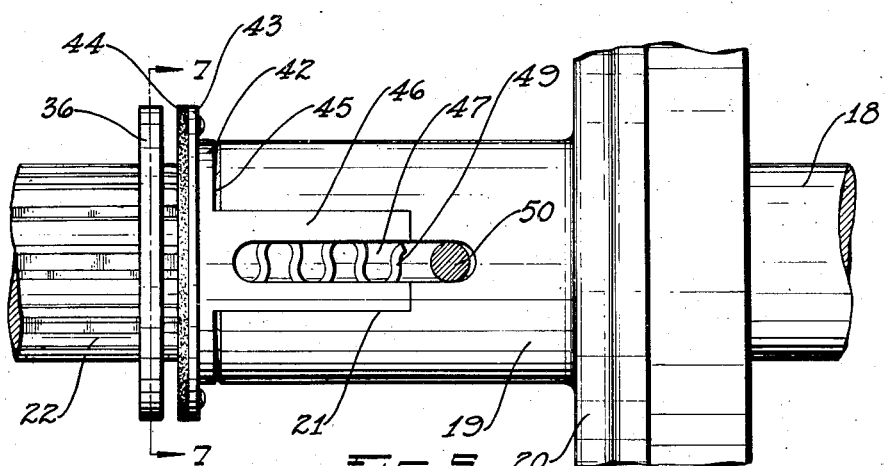
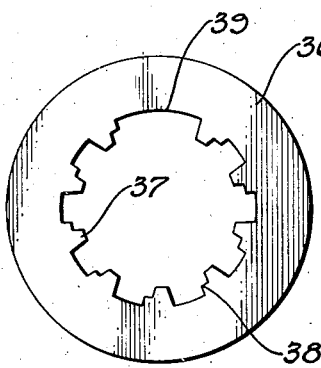
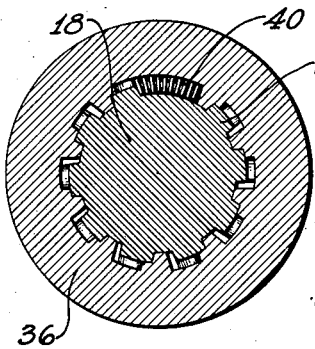
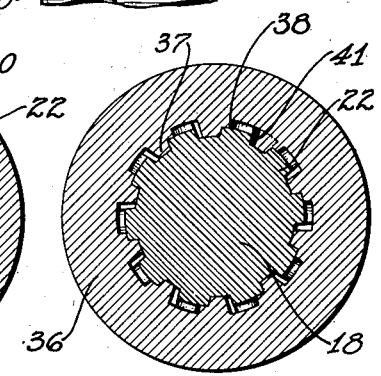

1,787,160

UNITED STATES PATENT OFFICE

ALFRED MOORHOUSE, OF DETROIT, MICHIGAN, ASSIGNOR TO PACKARD MOTOR CAR COMPANY, OF DETROIT, MICHIGAN, A CORPORATION OF MICHIGAN

CLUTCH BRAKE FOR MOTOR VEHICLES

Application filed November 4, 1927. Serial No. 230,973.

This invention relates to motor vehicles and more particularly to brake means for the clutches of such vehicles.

An object of the invention is to improve clutch brake mechanism.

Another object of the invention is to provide a clutch brake with means whereby the brake elements will be engaged with cushioned effect.

Another object of the invention is to provide a thrust washer for the shaft of a clutch mechanism, the washer being demountable upon the shaft and provided with means whereby it may be easily and quickly locked against rotation or axial movement.

Another object of the invention is to provide a clutch brake pressure sleeve slidably mounted on a clutch shaft and interconnected with a sleeve on the shaft secured against rotation.

A further object of the invention is to provide a clutch brake responsive to the movement of the clutch pedal, the structure being such that the initial movement of the pedal releases the driving and driven members of the clutch and further movement thereof applies the brake to effectively check the rotation of the clutch shaft.

A further object of the invention is to provide a clutch brake mechanism comprising a demountable member on the shaft of a clutch mechanism adaptable for co-operation with a member slidably mounted upon the shaft and secured against rotation, one of the members being provided with means whereby a cushioned effect is attained when the members are forced into engagement.

Other objects of the invention will appear from the following description taken in connection with the drawings which form a part of this specification and in which Fig. 1 is a sectional view of a clutch assembly embodying the invention, Fig. 2 is a plan view of the frictional plate carried by one of the braking members, Fig. 3 is a view in side elevation of the clutch brake pressure sleeve illustrating the sinusoidal spring, Fig. 4 is an end view of the clutch brake pressure sleeve, Fig. 5 is an elevation illustrating the clutch shaft, the sleeve on the bearing housing and the clutch brake pressure sleeve, Fig. 6 is a plan view of the thrust washer, Fig. 7 is a sectional view of the clutch shaft with the thrust washer thereon locked in position by the spring retaining means, and Fig. 8 is a sectional view of the clutch shaft illustrating the thrust washer keyed thereon.

Referring by numerals to the drawings, 10 represents the rear end of a motor crankshaft having a radial flange 11 and an axial bore or recess 12, the recess being shouldered as indicated at 13. A flywheel 14 is bolted or otherwise secured upon the flange and is provided with a central aperture 15 somewhat smaller in diameter than the recess 12 and in axial alinement therewith. The aperture 15 in the flywheel receives and supports a radial ball bearing 16 secured against axial movement by the shoulder 13 in the end of the crankshaft and a ring or plate 17 demountably secured on the flywheel. The bearing 16 receives and supports the forward end of the clutch shaft 18, the rear end of which extends through a bearing sleeve 19 formed on a bearing housing 20, and provided with a plurality of radial slots 21 equally spaced with respect to each other, the object of which will hereinafter appear.

The clutch shaft 18 is suitably splined as indicated at 22 to receive an internally splined hub 23 having secured thereto disks 24 faced with a suitable friction material and arranged to interleaf with plates 25 mounted on bolts 26 secured in the body of the flywheel. The plates 25 are generally known as driving plates or elements and the disks 24 as the driven plates or elements. These driving and driven elements are normally held in engagement by the tension of coil springs 27 mounted in a casing 28 supported on the stud bolts 26, the springs being interposed between the casing and the outer or rear driving element 25. This outer element 25 has secured thereto stud bolts 29 upon which are mounted levers 30 projecting inwardly through slots 31 in the casing. The levers 30 are actuated by a throw-out collar 32 having a ball bearing 33 adapted for engaging the levers 30, the throw-out collar being engaged and actuated by a clutch shifter fork, not shown, to compress the springs 27 which allow the driving and driven elements to slightly spread and disengage.

The clutch shaft 18 is provided intermediate the sleeve 19 and the hub 23 with a circumferential groove or slot 34, the depth of which is substantially one-half of the depth of the splines on the shaft, except as to one spline which is cut the full depth thereof as indicated at 35. This groove receives a thrust washer 36 which is removably mounted therein. As shown, the thrust washer 36 comprises a disk equal in thickness to the width of the groove 34 and is fitted therein to turn smoothly. This washer is provided with internal splines 37 milled for a portion of their depth to form shoulders 38, and one spline is removed or omitted to provide an arcuate opening 39 for the reception of a light compression coil spring 40.

The spring 40 is inserted in the circumferential groove 34 transversely disposed with respect to the spline slotted as indicated at 35. The thrust washer is then slipped on the shaft, the splines 37 on the washer meshing with the splines 22 on the shaft. The spring 40 is then compressed and the washer advanced to register with the circumferential slot or groove 34, whereupon the spring is released and the washer urged by the spring is slightly rotated to engage the shoulders 38 on the splines 37 with the circumferential slot in the splines on the shaft 18 in which position the washer is held by the tension of the spring. As the shaft 18 always turns in the same direction, except when the engine back-fires, it follows that the washer 36 is locked on the shaft 18 both rotatably and axially. In some instances it may be found advantageous to eliminate spring 40 and to employ in lieu thereof a key 41 driven between one of each of the splines 22 and 37.

Mounted upon the shaft 18 forwardly of the sleeve 19 and adjacent the thrust washer 36 is a clutch brake pressure sleeve 42 having a radial flange 43 to which is secured a suitable friction plate 44 adapted for engagement with the thrust washer 36. The sleeve 42 is slotted as shown at 45 to provide a plurality of fingers 46 engaging the slots 21 in the sleeve 19. This interconnection prevents rotatable movement of the sleeve 42 but allows slidable movement thereof. The fingers 46 are slotted as indicated at 47 and grooved at 48 to receive sinusoidal springs 49. These springs are engaged by pins 50 carried by the throw-out collar 32 and adapted for reciprocation in the slots 47.

Responsive to the movement of the clutch pedal actuating the throw-out collar to disengage the driving and driven elements of the clutch, the pins 50 carried by the throw-out collar are advanced longitudinally in the slots 47 to a predetermined position, which is coincident with the disengagement of the driving and driven elements, whereupon the pins 50 engage the sinusoidal springs and upon further pressure on the clutch pedal sleeve 42 is advanced to engage the friction plate 44 with the thrust washer 36, the sinusoidal springs 49 serving to cushion the pressure and enhance the braking effect.

While I have herein described in some detail a specific embodiment of my invention, which I deem to be new and advantageous and may specifically claim, I do not desire it to be understood that my invention is limited to the exact details of construction, as it will be apparent that other changes may be made therein without departing from the spirit or scope of my invention.

Having thus described the various features of my invention, what I claim as new and desire to secure by Letters Patent is:

1. A brake mechanism comprising a splined shaft having grooves in the splines, a splined washer for the shaft, shoulders upon the splines on the washer adapted to engage the grooves in the splines on the shaft and means retaining the shoulders within the grooves.

2. A brake mechanism comprising a splined shaft having a circumferential groove, an interiorly splined washer for the shaft, shoulders upon the splines on the washer adapted to engage the groove in the splines on the shaft and means for urging the shoulders into engagement with the groove.

3. A brake mechanism comprising a splined shaft having a circumferential groove, a splined washer adapted to slip over the said shaft and to register with said groove, shoulders upon the splines in the washer adapted to engage the groove in the splines on the shaft and a spring for retaining the shoulders in engagement with the groove.

4. A brake mechanism comprising a clutch brake pressure sleeve having a radial flange, the sleeve having longitudinal slots provided with grooves and sinusoidal springs mounted in said grooves.

5. A brake mechanism comprising a clutch brake pressure sleeve having a radial flange, a friction plate secured to said flange, the sleeve slotted to provide a plurality of fingers, the fingers being slotted and grooved, and sinusoidal springs mounted in the grooves.

6. A brake mechanism comprising a clutch brake pressure sleeve, a radial flange on the sleeve, a friction plate on the face of the flange, the sleeve having a plurality of longitudinal slots equally spaced to form a plurality of fingers, the fingers being slotted and provided with grooves and sinusoidal springs mounted in the grooves.

7. A brake mechanism comprising a clutch shaft, a thrust washer on the shaft secured against rotation and axial movement, a sleeve on the shaft secured against rotation, a clutch brake pressure sleeve slidably mounted on the shaft intermediate the thrust washer and the sleeve secured against rotation, fingers on the clutch brake pressure sleeve engaging slots in the sleeve secured against rotation, springs mounted in the fingers and means engaging the springs to actuate the clutch brake pressure sleeve for coaction with the thrust washer.

8. In a motor vehicle, the combination with a clutch mechanism comprising driving and driven members, a clutch shaft associated with the driven members, a thrust washer on the shaft secured against rotation and axial movement, a sleeve on the shaft secured in a fixed position, a clutch brake pressure sleeve slidable on the shaft intermediate the thrust washer and the sleeve secured in a fixed position, fingers on the clutch brake pressure sleeve positioned in slots in the fixed sleeve, cushioned members in the fingers, a throw-out collar on the sleeve secured in a fixed position adapted to actuate the driving and driven members and means associated with the throw-out collar engaging the cushioned members for actuating the clutch brake sleeve for cooperation with the thrust washer.

9. In a motor vehicle, the combination with a clutch mechanism including driving and driven members and a clutch shaft carrying the driven member, a sleeve on the shaft secured in a fixed position, a thrust washer secured on the shaft, a clutch brake pressure sleeve slidably mounted on the shaft, fingers on said clutch brake pressure sleeve engaging slots in the fixed position sleeve, cushion members carried by the fingers, a throw-out collar upon the fixed position sleeve for controlling the driving and driven members of the clutch, and means associated with the throw-out collar engaging the cushion members for actuating the clutch brake pressure sleeve for cooperation with the thrust washer.

In testimony whereof I affix my signature.
ALFRED MOORHOUSE.